United States Patent
Bauco

(10) Patent No.: US 10,234,614 B2
(45) Date of Patent: Mar. 19, 2019

(54) LIGHT SOURCE ASSEMBLIES AND SYSTEMS AND METHODS WITH MODE HOMOGENIZATION

(71) Applicant: Corning Research & Development Corporation, Corning, NY (US)

(72) Inventor: Anthony Sebastian Bauco, Horseheads, NY (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 15/411,183

(22) Filed: Jan. 20, 2017

(65) Prior Publication Data

US 2018/0210126 A1    Jul. 26, 2018

(51) Int. Cl.
| | | |
|---|---|---|
| F21V 8/00 | (2006.01) | |
| G02B 6/44 | (2006.01) | |
| G02B 6/42 | (2006.01) | |
| G02B 6/38 | (2006.01) | |

(52) U.S. Cl.
CPC ......... *G02B 6/0006* (2013.01); *G02B 6/0008* (2013.01); *G02B 6/421* (2013.01); *G02B 6/4285* (2013.01); *G02B 6/447* (2013.01); *G02B 6/3825* (2013.01); *G02B 2006/4297* (2013.01)

(58) Field of Classification Search
CPC ...... G02B 6/421; G02B 6/447; G02B 6/3825; G02B 6/4296; G02B 6/0005; G02B 6/0006; G02B 6/0008; G02B 6/4285; G02B 2006/4297
USPC .................. 385/15, 31–33, 39, 53, 100–101, 385/123–128, 134–136, 88
See application file for complete search history.

(56) References Cited

U.S. PATENT DOCUMENTS

| | | | |
|---|---|---|---|
| 3,942,859 | A | 3/1976 | Korodi |
| 4,412,936 | A | 11/1983 | Khmelkov et al. |
| 4,466,697 | A | 8/1984 | Daniel |

(Continued)

FOREIGN PATENT DOCUMENTS

| | | |
|---|---|---|
| CN | 200941319 Y | 8/2007 |
| CN | 201419706 Y | 3/2010 |

(Continued)

OTHER PUBLICATIONS

U.S. Appl. No. 62/193,638, A. Bauco et al., "Systems and Methods for Traceable Cables," filed Jul. 17, 2015.

(Continued)

*Primary Examiner* — Michael P Mooney
(74) *Attorney, Agent, or Firm* — Robert L. Branham

(57) ABSTRACT

A method of generating light for use in tracing an end of a cable assembly includes coupling convergent visible light into an input end of a multimode mode-homogenizing optical fiber having low-order and high-order modes and comprising an output end, a fiber angle, a length and a mode-homogenization length. The inputted light is initially concentrated mainly in the low-order modes. The method also includes conveying the light through the length of the mode-homogenizing optical fiber to form outputted light that is substantially mode-homogenized, substantially spatially uniform and substantially angularly uniform and having a divergence angle that is substantially the same as the fiber angle. Light source assemblies and systems for carrying out the method are also disclosed.

28 Claims, 9 Drawing Sheets

(56) References Cited

U.S. PATENT DOCUMENTS

| | | |
|---|---|---|
| 4,557,552 A | 12/1985 | Newton et al. |
| 4,637,686 A | 1/1987 | Iwamoto et al. |
| 4,712,858 A | 12/1987 | Presby |
| 4,755,018 A | 7/1988 | Heng et al. |
| 4,763,984 A | 8/1988 | Awai et al. |
| 4,923,274 A | 5/1990 | Dean |
| 4,995,691 A * | 2/1991 | Purcell, Jr. ............ G02B 6/421 385/29 |
| 5,006,806 A | 4/1991 | Rippingale et al. |
| 5,017,873 A | 5/1991 | Rippingale et al. |
| 5,040,867 A | 8/1991 | de Jong et al. |
| 5,122,750 A | 6/1992 | Rippingale et al. |
| 5,179,611 A | 1/1993 | Umeda et al. |
| 5,206,065 A | 4/1993 | Rippingale et al. |
| 5,305,405 A | 4/1994 | Emmons et al. |
| 5,329,348 A | 7/1994 | Nimura et al. |
| 5,333,228 A | 7/1994 | Kingstone |
| 5,377,292 A | 12/1994 | Bartling et al. |
| 5,394,496 A | 2/1995 | Caldwell et al. |
| 5,395,362 A * | 3/1995 | Sacharoff ............... A61B 18/22 600/108 |
| 5,432,876 A | 7/1995 | Appeldorn et al. |
| 5,463,706 A | 10/1995 | Dumont et al. |
| 5,500,913 A | 3/1996 | Allen et al. |
| 5,591,160 A | 1/1997 | Reynard |
| 5,666,453 A | 9/1997 | Dannenmann |
| 5,741,152 A | 4/1998 | Boutros |
| 5,764,043 A | 6/1998 | Czosnowski et al. |
| 5,835,654 A | 11/1998 | Bergmann |
| 5,979,188 A | 11/1999 | Ojha |
| 5,982,967 A | 11/1999 | Mathis et al. |
| 6,126,325 A * | 10/2000 | Yamane ................ G02B 6/421 385/70 |
| 6,137,928 A | 10/2000 | Albrecht |
| 6,137,935 A | 10/2000 | Bohme et al. |
| 6,173,097 B1 | 1/2001 | Throckmorton et al. |
| 6,257,750 B1 | 7/2001 | Strasser et al. |
| 6,293,081 B1 | 9/2001 | Grulick et al. |
| 6,301,418 B1 | 10/2001 | Freier et al. |
| 6,311,000 B1 | 10/2001 | Schneider |
| 6,314,713 B1 | 11/2001 | Fitz et al. |
| 6,317,553 B1 | 11/2001 | Harper, Jr. et al. |
| 6,347,172 B1 | 2/2002 | Keller et al. |
| 6,356,690 B1 | 3/2002 | McAlpine et al. |
| 6,379,054 B2 | 4/2002 | Throckmorton et al. |
| 6,388,194 B1 | 5/2002 | Ryeczek |
| 6,403,947 B1 | 6/2002 | Hoyt et al. |
| 6,425,694 B1 | 7/2002 | Szilagyi et al. |
| 6,439,780 B1 | 8/2002 | Mudd et al. |
| 6,456,768 B1 | 9/2002 | Boncek et al. |
| 6,456,785 B1 | 9/2002 | Evans |
| 6,471,412 B1 | 10/2002 | Belenkiy et al. |
| 6,519,396 B2 | 2/2003 | Schneider et al. |
| 6,526,200 B1 | 2/2003 | Davie |
| 6,532,328 B1 | 3/2003 | Kline |
| 6,554,485 B1 | 4/2003 | Beatty et al. |
| 6,560,390 B2 | 5/2003 | Grulick et al. |
| 6,577,243 B1 | 6/2003 | Dannenmann et al. |
| 6,596,943 B1 | 7/2003 | Ward |
| 6,606,431 B2 | 8/2003 | Unsworth |
| 6,643,443 B2 | 11/2003 | Holman et al. |
| 6,678,449 B2 | 1/2004 | Thompson et al. |
| 6,695,491 B1 | 2/2004 | Leeman et al. |
| 6,704,479 B2 | 3/2004 | Koplow |
| 6,710,254 B2 | 3/2004 | Yueh |
| 6,712,524 B2 | 3/2004 | Beatty et al. |
| 6,728,453 B2 | 4/2004 | Petryszak |
| 6,798,956 B2 | 9/2004 | Morrison |
| 6,816,661 B1 | 11/2004 | Barnes et al. |
| 6,823,120 B2 | 11/2004 | Hurley et al. |
| 6,906,505 B2 | 6/2005 | Brunet et al. |
| 6,933,438 B1 | 8/2005 | Watts et al. |
| 6,969,273 B2 | 11/2005 | Chen |
| 6,979,223 B2 | 12/2005 | Chen |
| 7,020,369 B2 | 3/2006 | Lodge, Jr. et al. |
| 7,029,137 B2 | 4/2006 | Lionetti et al. |
| 7,038,135 B1 | 5/2006 | Chan et al. |
| 7,049,937 B1 | 5/2006 | Zweig et al. |
| 7,090,411 B2 | 8/2006 | Brown |
| 7,121,707 B2 | 10/2006 | Currie et al. |
| 7,164,819 B2 | 1/2007 | Jenson et al. |
| 7,217,152 B1 | 5/2007 | Xin et al. |
| 7,221,284 B2 | 5/2007 | Scherer et al. |
| 7,242,831 B2 | 7/2007 | Fee |
| 7,313,304 B2 | 12/2007 | Andrews et al. |
| 7,401,961 B2 | 7/2008 | Longatti et al. |
| 7,406,231 B1 | 7/2008 | Beck et al. |
| 7,433,565 B2 | 10/2008 | Joseph et al. |
| 7,524,082 B2 | 4/2009 | North |
| 7,544,909 B2 | 6/2009 | Dhir |
| 7,572,066 B2 | 8/2009 | De Jong et al. |
| 7,596,293 B2 | 9/2009 | Isenhour et al. |
| 7,603,020 B1 | 10/2009 | Wakileh et al. |
| 7,618,175 B1 | 11/2009 | Hulse |
| 7,620,279 B2 | 11/2009 | Joseph |
| 7,653,277 B2 | 1/2010 | Andrews et al. |
| 7,671,279 B2 | 3/2010 | Yin |
| 7,748,860 B2 | 7/2010 | Brunet |
| 7,817,884 B2 | 10/2010 | Demeritt et al. |
| 7,920,764 B2 | 4/2011 | Kewitsch |
| 7,932,805 B2 | 4/2011 | Darr et al. |
| 7,948,226 B2 | 5/2011 | Rathbun, II et al. |
| 8,000,576 B2 | 8/2011 | Chen et al. |
| 8,102,169 B2 | 1/2012 | Law et al. |
| 8,150,227 B2 | 4/2012 | Kewitsch |
| 8,167,471 B1 | 5/2012 | Moritz |
| 8,152,385 B2 | 10/2012 | De Jong et al. |
| 8,314,603 B2 | 11/2012 | Russell |
| 8,322,871 B1 | 12/2012 | Knaggs et al. |
| 8,331,752 B2 | 12/2012 | Biribuze et al. |
| 8,408,029 B2 | 4/2013 | De Angelis et al. |
| 8,414,319 B2 | 4/2013 | Patel et al. |
| 8,428,405 B2 | 4/2013 | Kewitsch |
| 8,492,448 B2 | 7/2013 | Dewa et al. |
| 8,509,579 B2 | 8/2013 | Martin-Lopez |
| 8,545,076 B2 | 10/2013 | Bickham et al. |
| 8,548,293 B2 | 10/2013 | Kachmar |
| 8,582,939 B2 | 11/2013 | Gimblet et al. |
| 8,582,940 B2 | 11/2013 | Abernathy et al. |
| 8,591,087 B2 | 11/2013 | Bickham et al. |
| 8,620,123 B2 | 12/2013 | Dean, Jr. et al. |
| 8,620,125 B2 | 12/2013 | Button et al. |
| 8,683,827 B2 | 4/2014 | De Angelis et al. |
| 8,708,724 B2 | 4/2014 | Patel et al. |
| 8,724,942 B2 | 5/2014 | Logunov et al. |
| 8,770,525 B2 | 7/2014 | Donaldson et al. |
| 8,787,717 B2 | 7/2014 | Logunov |
| 8,791,829 B2 | 7/2014 | Gustafsson et al. |
| 8,798,419 B2 | 8/2014 | Wessels, Jr. et al. |
| 8,805,141 B2 | 8/2014 | Fewkes et al. |
| 8,896,286 B2 | 11/2014 | Abuelsaad et al. |
| 8,896,287 B2 | 11/2014 | Abuelsaad et al. |
| 8,897,612 B2 | 11/2014 | Logunov |
| 8,903,212 B2 | 12/2014 | Kachmar |
| 8,909,013 B1 | 12/2014 | Jiang et al. |
| 8,929,703 B2 | 1/2015 | Logunov et al. |
| 9,025,923 B2 | 5/2015 | Logunov et al. |
| 9,073,243 B2 | 7/2015 | Gimblet et al. |
| 9,146,347 B2 | 9/2015 | Logunov et al. |
| 9,182,561 B2 | 11/2015 | Bauco et al. |
| 9,196,975 B2 | 11/2015 | Scherer et al. |
| 9,271,709 B2 | 3/2016 | Grey et al. |
| 9,304,278 B1 | 4/2016 | Bauco et al. |
| 9,388,975 B2 | 7/2016 | Wenger |
| 9,429,731 B2 | 8/2016 | Bookbinder et al. |
| 9,435,713 B2 | 9/2016 | Collier et al. |
| 9,448,380 B2 | 9/2016 | Mogensen |
| 9,507,096 B2 | 11/2016 | Isenhour et al. |
| 9,529,167 B2 | 12/2016 | Wu |
| 9,541,694 B2 | 1/2017 | Tissot |
| 9,709,750 B1 | 7/2017 | Kuang et al. |
| 2001/0002220 A1 | 5/2001 | Throckmorton et al. |
| 2001/0048797 A1 | 12/2001 | Van Dijk et al. |
| 2002/0009282 A1 | 1/2002 | Grulick et al. |

(56) References Cited

U.S. PATENT DOCUMENTS

| | | |
|---|---|---|
| 2002/0036775 A1 | 3/2002 | Wolleschensky et al. |
| 2002/0037133 A1 | 3/2002 | Unsworth |
| 2002/0136497 A1 | 9/2002 | McGarry et al. |
| 2002/0159735 A1 | 10/2002 | Edvold et al. |
| 2002/0185299 A1 | 12/2002 | Giebel |
| 2003/0002830 A1 | 1/2003 | Petryszak |
| 2003/0016924 A1 | 1/2003 | Thompson et al. |
| 2003/0108270 A1 | 6/2003 | Brimacombe et al. |
| 2003/0206519 A1 | 11/2003 | Sanders et al. |
| 2003/0222786 A1 | 12/2003 | Dannenmann et al. |
| 2004/0022504 A1 | 2/2004 | Hurley et al. |
| 2004/0052473 A1 | 3/2004 | Seo et al. |
| 2004/0146254 A1 | 7/2004 | Morrison |
| 2004/0160774 A1 | 8/2004 | Lionetti et al. |
| 2004/0179777 A1 | 9/2004 | Buelow, II et al. |
| 2004/0196648 A1 | 10/2004 | Franklin et al. |
| 2005/0052174 A1 | 3/2005 | Angelo et al. |
| 2005/0089284 A1 | 4/2005 | Ma |
| 2005/0212503 A1 | 9/2005 | Deibele |
| 2006/0104578 A1 | 5/2006 | Herbst |
| 2006/0133750 A1 | 6/2006 | Lee |
| 2006/0140562 A1 | 6/2006 | Joseph et al. |
| 2006/0193575 A1 | 8/2006 | Greenwood et al. |
| 2006/0232385 A1 | 10/2006 | Scherer et al. |
| 2006/0285350 A1 | 12/2006 | Wang |
| 2007/0116402 A1 | 5/2007 | Slade et al. |
| 2007/0153508 A1 | 7/2007 | Nall et al. |
| 2007/0217749 A1 | 9/2007 | Jong et al. |
| 2008/0080820 A1 | 4/2008 | Andrews et al. |
| 2008/0087082 A1 | 4/2008 | Andrews et al. |
| 2008/0121171 A1 | 5/2008 | Hulsey |
| 2008/0198618 A1 | 8/2008 | North |
| 2008/0204235 A1 | 8/2008 | Cook |
| 2008/0273844 A1 | 11/2008 | Kewitsch |
| 2009/0027873 A1 | 1/2009 | Tarlton |
| 2009/0297104 A1 | 12/2009 | Kachmar |
| 2009/0299440 A9 | 12/2009 | Slatkine |
| 2010/0021114 A1 | 1/2010 | Chen et al. |
| 2010/0066254 A1 | 3/2010 | Ott et al. |
| 2010/0148747 A1 | 6/2010 | Rathbun, II et al. |
| 2010/0166374 A1 | 7/2010 | Lapp |
| 2010/0274235 A1 | 10/2010 | Mihajlovic et al. |
| 2011/0034068 A1 | 2/2011 | Russell |
| 2011/0085776 A1 | 4/2011 | Biribuze et al. |
| 2011/0103747 A1 | 5/2011 | Chang et al. |
| 2011/0103757 A1 | 5/2011 | Alkemper et al. |
| 2011/0122646 A1 | 5/2011 | Bickham et al. |
| 2011/0150488 A1 | 6/2011 | Kewitsch |
| 2011/0305035 A1 | 12/2011 | Bickham et al. |
| 2012/0019900 A1 | 1/2012 | Kitson et al. |
| 2012/0219259 A1 | 8/2012 | Kewitsch |
| 2012/0275178 A1 | 11/2012 | Logunov |
| 2012/0275180 A1 | 11/2012 | Button et al. |
| 2012/0275745 A1 | 11/2012 | Logunov |
| 2013/0021597 A1 | 1/2013 | Carlson, Jr. et al. |
| 2013/0088888 A1 | 4/2013 | Fewkes et al. |
| 2013/0107565 A1 | 5/2013 | Genier |
| 2013/0201001 A1 | 8/2013 | Ratnakar |
| 2013/0209045 A1 | 8/2013 | Dean, Jr. et al. |
| 2013/0272014 A1 | 10/2013 | Logunov et al. |
| 2013/0341922 A1 | 12/2013 | Jimenez Buendia |
| 2014/0016904 A1 | 1/2014 | Kachmar |
| 2014/0070639 A1 | 3/2014 | Tamura |
| 2014/0221763 A1 | 8/2014 | Vayser et al. |
| 2014/0227438 A1 | 8/2014 | Dean, Jr. et al. |
| 2014/0270639 A1 | 9/2014 | James, III et al. |
| 2014/0355295 A1 | 12/2014 | Kuchinsky et al. |
| 2014/0363134 A1 | 12/2014 | Bookbinder et al. |
| 2015/0043875 A1 | 2/2015 | Bookbinder et al. |
| 2015/0049992 A1 | 2/2015 | Bauco |
| 2015/0369986 A1 | 12/2015 | Logunov et al. |
| 2016/0139353 A1 | 5/2016 | Bauco et al. |
| 2016/0202418 A1 | 7/2016 | Fortin et al. |
| 2016/0231521 A1 | 8/2016 | Smith et al. |
| 2016/0291277 A1 | 10/2016 | Bauco et al. |
| 2016/0313483 A1 | 10/2016 | Chomycz |
| 2016/0313513 A1 | 10/2016 | Wijbrans et al. |
| 2016/0341922 A1 | 11/2016 | Bauco et al. |
| 2016/0377616 A1 | 12/2016 | Tong et al. |
| 2017/0123167 A1 | 5/2017 | Isenhour |
| 2017/0207585 A1 | 7/2017 | Butler et al. |
| 2017/0293102 A1 | 10/2017 | Bauco et al. |
| 2017/0315318 A1 | 11/2017 | Modavis |
| 2018/0128996 A1 | 5/2018 | Sawicki et al. |
| 2018/0136398 A1 | 5/2018 | Bauco et al. |
| 2018/0136399 A1 | 5/2018 | Bauco et al. |

FOREIGN PATENT DOCUMENTS

| | | | |
|---|---|---|---|
| CN | 102589728 A | 7/2012 | |
| CN | 201305952 U | 7/2012 | |
| CN | 202305952 U | 7/2012 | |
| CN | 203241575 U | 10/2013 | |
| DE | 4413597 A1 | 10/1995 | |
| DE | 10239602 B3 | 2/2004 | |
| DE | 102007025494 A1 | 12/2008 | |
| DE | 102009015263 A1 | 10/2010 | |
| DE | 202015007044 U1 | 12/2015 | |
| EP | 0874191 A2 | 10/1998 | |
| EP | 0952589 A2 | 10/1999 | |
| EP | 1168025 A2 | 1/2002 | |
| EP | 2113969 A1 | 11/2009 | |
| GB | 2260198 A | 4/1993 | |
| GB | 2375898 A | 11/2002 | |
| JP | 57011305 A | 6/1980 | |
| JP | 59182404 A | 4/1983 | |
| JP | 61139221 A | 6/1986 | |
| JP | 61161827 U | 10/1986 | |
| JP | 1990055506 A | 2/1990 | |
| JP | 2108007 A | 4/1990 | |
| JP | 2108008 A | 4/1990 | |
| JP | 6017157 U | 3/1994 | |
| JP | 06130253 A | 5/1994 | |
| JP | 9178956 A | 7/1997 | |
| JP | 9237524 A | 9/1997 | |
| JP | 2008153030 A | 7/2008 | |
| JP | 2009244288 A | 10/2009 | |
| JP | 2010237233 A | 10/2010 | |
| JP | 2013196960 | 9/2013 | |
| KR | 875507 B1 | 12/2008 | |
| WO | 1998034144 A1 | 8/1998 | |
| WO | 199024856 A1 | 5/1999 | |
| WO | WO-9924856 * | 5/1999 | ............... G02B 6/42 |
| WO | 2000011484 A1 | 3/2000 | |
| WO | 02095289 A1 | 11/2002 | |
| WO | 2005106899 A1 | 11/2005 | |
| WO | 2006044177 A2 | 4/2006 | |
| WO | 2006113114 A2 | 10/2006 | |
| WO | 2007053371 A1 | 5/2007 | |
| WO | 2008048955 A2 | 4/2008 | |
| WO | 2010011299 A2 | 1/2010 | |
| WO | 2010021896 A1 | 2/2010 | |
| WO | 2011063214 A | 5/2011 | |
| WO | 2011063214 A1 | 5/2011 | |
| WO | 2013055842 A1 | 4/2013 | |
| WO | 2013059811 A1 | 4/2013 | |
| WO | 2013122825 A1 | 8/2013 | |
| WO | 2014026300 A1 | 2/2014 | |
| WO | 2015000194 A1 | 1/2015 | |

OTHER PUBLICATIONS

U.S. Appl. No. 62/221,769, A. Bauco et al., "Systems and Methods for Traceable Cables," filed Sep. 22, 2015.

http://www.dexim.net/list.php?id=7, Dexim product reference, downloaded from the web Feb. 24, 2016. 2 pages.

Kremenakova, et al., "Characterizaion of Side EmmittingPolymeric Optical Fibres," Jounal of Fiber Bioengineering & Informatics 5:4 (2012) pp. 423-431, http://www.jfbi.org, Dec. 2012.

Fiber Optic Products, Inc., "Specifications of our Fiber and Cable," n.d. Retrieved on Aug. 9, 2013, 2 pages.

M. Rajesh, "Polymer Photonics: An Overview," Fabrication and Characterisation, 2011, 38 pages.

(56) References Cited

OTHER PUBLICATIONS

Schott, "SpectraStream Glass Harnesses," Rev. 11/06, 2 pages.
Spigulis, J., "Side-Emitting Fibers Brighten Our World in New Ways," Oct. 2005, Retrieved from www.osa-opn.org, 6 pages.
Patent Cooperation Treaty, International Search Report, Application No. PCT/US2013/025262, dated Jul. 16, 2013, 7 pages.
U.S. Appl. No. 62/193,638, U.S. Appl. No. 62/221,769—Listed in ID AS 26113.
"Super Vision Fiber Optics Side Glow Cables, " TriN01ihLighting.com, Tri North Lighting, Inc., n.d., Web. Aug. 1, 2013.
U.S. Appl. No. 13/431,565 filed Mar. 27, 2012, David L. Dean, Jr., 32 pages.
European Search Report, Application No. 15168466.9-1553, dated Dec. 17, 2015, 9 pages.
Optical fiber with nanostructured cladding ofTi02 nanoparticles self-assembled onto a side polished fiber and its temperature sensing, Lu et al., Optics Express, vol. 22, No. 26, Dec. 29, 2014, 7 pages, downloaded from internet on Jan. 5, 2015.
Patent Cooperation Treaty, International Search Report for PCT/US2015/060558, dated Feb. 9, 2016, 5 pages.
Patent Cooperation Treaty International Search Report, Application No. PCT/US2014/049524, dated Jan. 20, 2015, 5 pages.
"Diode Lasers, Fiber Optics, IR, Red, Green, Blue Diode Lasers, Laser Diode, Fiber Illuminators, Fiber Optics, Coupler, Galvonarneters, Laser Show Acessories," Jan. 1, 2013, httn://www.meshtel.com/, 1 oage.
Patent Cooperation Treaty, International Search Report, PCT/US2014/049525, dated Jan. 23, 2015, 18 pages.
U.S. Appl. No. 14/295,844, Bookbinder filed Jun. 4, 2014, 25 pages.
Patent Cooperation Treaty, International Search Report and Written Opinion for International Application No. PCT/US2014/041510, dated Sep. 18, 2014, 10 pages.
U.S. Appl. No. 14/791,924, filed May 20, 2015.
U.S. Appl. No. 15/000,128, filed Jan. 19, 2016.
U.S. Appl. No. 15/054,380, filed Mar. 31, 2015.
U.S. Appl. No. 15/142,853, filed Apr. 29, 2016.
U.S. Appl. No. 62/193,638, filed Jul. 17, 2015.
U.S. Appl. No. 62/193,643, filed Jul. 17, 2015.
U.S. Appl. No. 62/221,769, filed Sep. 22, 2015.
U.S. Appl. No. 62/221,774, filed Sep. 22, 2015.
U.S. Appl. No. 62/248,490, filed Oct. 30, 2015.
International Search Report and Written Opinion PCT/US2016/020542 dated Jun. 7, 2016.
"Side Emitting Super Glowing Fiber." MeshTel.com. MeshTel-Intelite, Inc., 1996-2012. Web. Aug. 1, 2013.
European Search Report EP15168466 dated Dec. 17, 2015.
International Search Report and Written Opinion PCT/US2016/031624 dated Aug. 31, 2016.
International Search Report and Written Opinion PCT/US2016/042414 dated Oct. 5, 2016.
International Searching Authority Invitation to Pay Additional Search Fees PCT/US2016/042416 dated Oct. 7, 2016.
International Searching Authority Invitation to Pay Additional Fees PCT/US2016/055497 dated Dec. 19, 2016.
Endruweit et al. "Spectroscopic experiements regarding the efficiency of side emission optical fibres in the UV-A and visible blue spectrum", Optics and Lasers Engineering 46 (2008) pp. 97-105.
PCT International Search Report and Written Opinion for PCT/US2014/039483, dated Jul. 25, 2014, 6 Pages.
International Search Report and Written Opinion PCT/US2018/013472 dated Apr. 24, 2018.
International Search Report and Written Opinion PCT/US20147/012899 dated Mar. 9, 2017.
International Preliminary Report on Patentability for PCT/US2013/025262, dated Aug. 28, 2014, 11 pages.
International Preliminary Report on Patentability for PCT/US2014/039483, dated Dec. 10, 2015, 10 pages.
International Search Report and Written Opinion for PCT/US2014/049524, dated Jan. 20, 2015, 11 pages.
International Preliminary Report on Patentability for PCT/US2014/049524, dated Nov. 30, 2015, 7 pages.
International Preliminary Report on Patentability for PCT/US2015/060558, dated Jun. 1, 2017, 9 pages.
International Preliminary Report on Patentability for PCT/US2016/020542, dated Oct. 12, 2017, 8 pages.
International Preliminary Report on Patentability for PCT/US2016/042416, dated Feb. 1, 2018, 10 pages.
International Preliminary Report on Patentability for PCT/US2016/055497, dated May 11, 2018, 10 pages.

* cited by examiner

LIGHT SOURCE ASSEMBLIES AND SYSTEMS AND METHODS WITH MODE HOMOGENIZATION

U.S. Provisional Patent Application Ser. No. 62/320,024, entitled "Traceable end point cable assembly," filed on Apr. 8, 2016, is incorporated herein by reference.

FIELD

The present disclosure relates to light source assemblies and systems and methods with mode homogenization for eye-safe operation, and in example embodiment, relates to a light source assembly and system with mode homogenization for a traceable cable assembly.

BACKGROUND

Telecommunications and data networks rely on the use of both long and short optical fiber cables. The long optical fiber cables are typically several hundred meters to many kilometers and are used to interconnect distant locations, such as data centers located in different cities or different countries. The short optical fiber cables are typically 0.5 meters up to tens of meters and are referred to in the art as "jumpers" or "patch cords" that have connectors on each end. These shorter optical fiber cables are used in offices, data centers and like facilities to optically connect data storage or optical communication equipment within a room, a building or even between buildings. For example, a given patch cord may be attached to a first port in a first equipment rack, run through the floor or other conduit, and terminate at a second port in a second equipment rack a few meters away. FIG. 1 shows how multiple patch cords PC can be connected at one end to respective ports P of an equipment rack ER. Presently, tens, hundreds or even thousands of such patch cords can be used in offices, data centers and like facilities.

As part of routine operation or maintenance, a technician may be required to trace the path of a patch cord from one end to the other within a given facility, e.g., for servicing, replacement, relocation or testing. This operation can be done manually by physically accessing the patch cord and following it from one end to the other over its route. Unfortunately, this is time intensive and labor intensive and is potentially disruptive to the network.

More recently, traceable patch cords have been developed that allow for a technician to quickly identify the terminal ends of a given patch cord. Traceable patch cords rely on tracer optical fibers integrated into the patch cord. The first end of the tracer optical fiber resides at a first connector of the traceable patch cord. Light from the light source is coupled into the first end of the tracer optical fiber and is emitted from the second end, which is located at the second connector of the traceable patch cord. The technician can then observe the light emitted from second end of the tracer optical fiber at the second connector to locate the second connector of the traceable patch cord among a collection of patch cords such as shown in FIG. 1.

The optical power of the visible light launched into the first end of the tracer optical fiber may be relatively high. Depending on the exact power level used, the emission from the light source may approach desired eye safety requirements. This in turn may require using a lower optical power to meet desired eye safely requirements. Unfortunately, this may also reduce the efficacy of the traceable patch cord because it may reduce the "brightness" (more accurately, the luminance) of the light emitted from the tracing fiber, making it harder for a technician to find the end of the traceable patch cord.

SUMMARY

An aspect of the disclosure is a light source assembly for use with a multimode delivery waveguide having an input end supported by an input connector. The light source includes: a housing having an interior and a bulkhead; a light emitter that resides within the housing interior and that emits visible light; a multimode mode-homogenizing optical fiber that has an input end, an output end, a fiber angle, a length L and a mode-homogenization length LMH, wherein the input end is optically coupled to the light emitter to receive the light at a convergence angle that is less than the fiber angle, and wherein the output end is supported by an output connector, and wherein the length L is in the range from $(0.8) \cdot LMH \leq L \leq (1.25) \cdot LMH$ so that the output end emits the light at a divergence angle that is substantially the same as the fiber angle; and a connector adapter having inner and outer receptacles, with the output connector of the mode-homogenizing optical fiber operably engaged in the inner receptacle and wherein the outer receptacle is configured to receive the input connector of the delivery waveguide.

Another aspect of the disclosure is a light source system for use with a traceable cable assembly terminated by first and second connectors. The light source system includes: a light emitter that emits light; a section of multimode mode-homogenizing optical fiber having an input end, an output end, a length L, a mode-homogenization length LMH, and a fiber angle $\theta_F$, and wherein $(0.8) \cdot LMH \leq L \leq (1.25) \cdot LMH$; an optical component operably disposed between the light emitter and the input end of the mode-homogenizing optical fiber to couple light into the input end of the mode-homogenizing optical fiber at a convergence angle $\theta_C$ that is less than the fiber angle $\theta_F$ and wherein the output end is supported by an output connector and that emits the light at a divergence angle $\theta_D$ in the range $(0.9) \cdot \theta_F \leq \theta_D \leq \theta_F$; a connector adapter having first and second receptacles, with the output connector operably engaged in the first receptacle; and a multimode delivery waveguide having an input end terminated by an input connector configured to be operably engaged and disengaged with the second receptacle of the connector adapter.

Another aspect of the disclosure is a method of generating light for use in tracing an end of a cable assembly. The method includes: a) coupling convergent visible light into an input end of a multimode mode-homogenizing optical fiber having low-order and high-order modes and comprising an output end, a fiber angle $\theta_F$, a length L and a mode-homogenization length LMH, and wherein the light is initially concentrated in the low-order modes; and b) conveying the light through the length L of the mode-homogenizing optical fiber to form outputted light that is substantially mode-homogenized, substantially spatially uniform and substantially angularly uniform and having a divergence angle $\theta_D$ in the range $(0.9) \cdot \theta_F \leq \theta_D \leq \theta_F$.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description explain the principles and operation of the various embodiments. As such, the disclosure will become more fully understood from the following Detailed Description, taken in conjunction with the accompanying Figures, in which.

DETAILED DESCRIPTION

Figure 1:
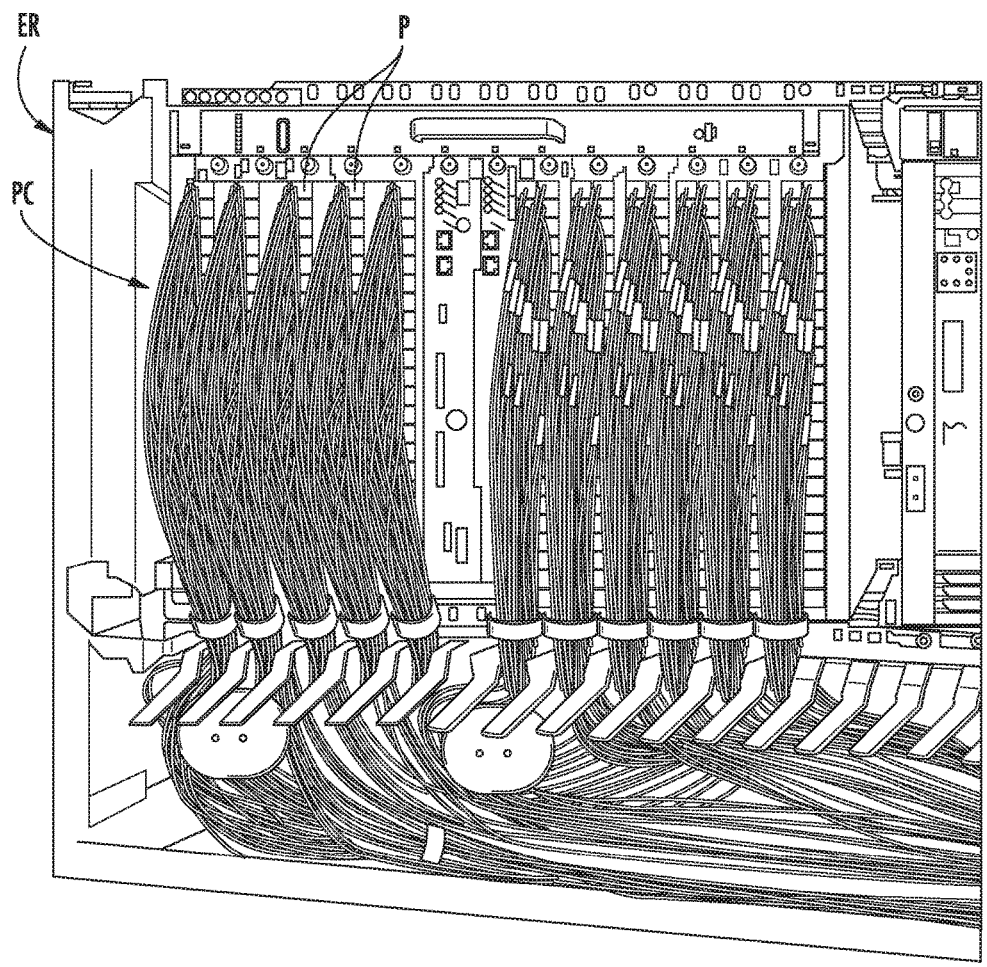
FIG. 1 is a perspective view of an equipment rack supporting multiple patch cords illustrating an example of a congested configuration of patch cords that can occur at an equipment rack.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

The term "numerical aperture" or NA is used herein to describe the light-collecting and light-emitting properties of the optical fibers used herein and is defined as NA=n·sin $\theta_F$, where n is the refractive index of the surrounding medium (taken as n=1 for air) and $\theta_F$ is the fiber angle, which is the maximum angle (measured relative to the optical fiber center line or the optical axis) over which the optical fiber can receive and emit light.

The "convergence angle" is denoted $\theta_C$ and refers to the maximum angle (measured relative to the optical fiber center line or the optical axis) over which light rays converge on a given location, such as at the end of an optical fiber. Thus, for a convergence angle $\theta_C$ of 8°, light rays can be said to converge over a range of angles from 0° up to the convergence angle of 8°.

The term "divergence angle" is denoted $\theta_D$ and refers to the maximum angle (measured relative to an optical axis or optical fiber centerline) over which light rays can diverge from a given location, such as from the end of an optical fiber. Thus, for a divergence angle $\theta_D$ of 12°, light rays can be said to diverge over a range of angles from 0° up to the divergence angle of 12°.

The term "luminance" is used herein to describe the light emitted from the output end of the mode-homogenizing optical fiber as introduced and described below. Luminance is a photometric measure of the luminous intensity per unit area of light traveling in a given direction. The SI unit for luminance is candelas per square meter or $cd/m^2$. Luminance can also be measured in lumens per square meter per steradian" or $lm/(sr·m^2)$. Candelas are lumens per steradian. The solid angle of light exiting a fiber is equal to $2·\pi·(1-\cos(\theta_D))$.

The luminance is invariant in an ideal optical system (i.e., one that has no loss and that obeys the laws of geometrical optics), meaning that the luminance at the output end of an ideal optical system is the same as the input illuminance (i.e., luminance is conserved). An aspect of the light source assembly disclosed herein is that the mode-homogenizing optical fiber renders the light source assembly non-ideal from the conservation of luminance standpoint so that light emitted from the mode-homogenizing optical fiber can meet eye safety standards the light would not otherwise be met if the mode-homogenizing optical fiber were replaced with a standard multimode optical fiber.

The term "modes" is used in connection with the mode-homogenizing optical fiber employed in the light source assembly disclosed herein. In geometrical optics terms, modes are the allowed paths of light propagation down an optical fiber. In electromagnetic terms, modes are the allowed electromagnetic field configurations for light to propagate down an optical fiber. A multimode optical fiber has a plurality of modes, typically tens or hundreds or even thousands of modes, with a single lowest-order (also called the "fundamental mode") representing the most direct optical path through the optical fiber. The higher-order modes representing increasingly more indirect optical paths through the optical fiber. In the description below, for a multimode optical fiber that supports N modes, the term "low-order modes" refers to the modes from N=1 to N/2 (with N=1 being the fundamental mode), while the term "high-order modes" refers to the modes from (N/2)+1 to N. Thus, for a multimode optical fiber that supports 100 modes, the modes 1 through 50 are considered herein to be the low-order modes while the modes 51 through 100 are considered herein to be the high-order modes. This terminology is adopted for ease of discussion and explanation. Aspects of the disclosure include light initially traveling mainly in the low-order modes, i.e., the light is concentrated in the low-order modes, with some light supported in the high-order modes, with the light being distributed substantially evenly over all of the modes only after having traveled sufficiently far down the mode-homogenizing optical fiber. The distinction between transverse electric (TE) and transverse magnetic TM modes is not critical to the explanation and understanding of the light source assembly disclosed herein and so is not described in detail herein for ease of explanation.

Traceable End-Point Cable System

The light-source system described herein has a variety of uses and applications. Thus, the description herein is not limited to the specific illustrative embodiments described in detail below. In other words, while the light source systems and assemblies are described in the context of a traceable patch cord environment, the light source systems and assemblies are not limited to this particular use and may be implemented in any other suitable environment that requires eye-safe light sources and assemblies or light source systems and assemblies having homogenized modes and a substantially uniform light output.

Figure 2:
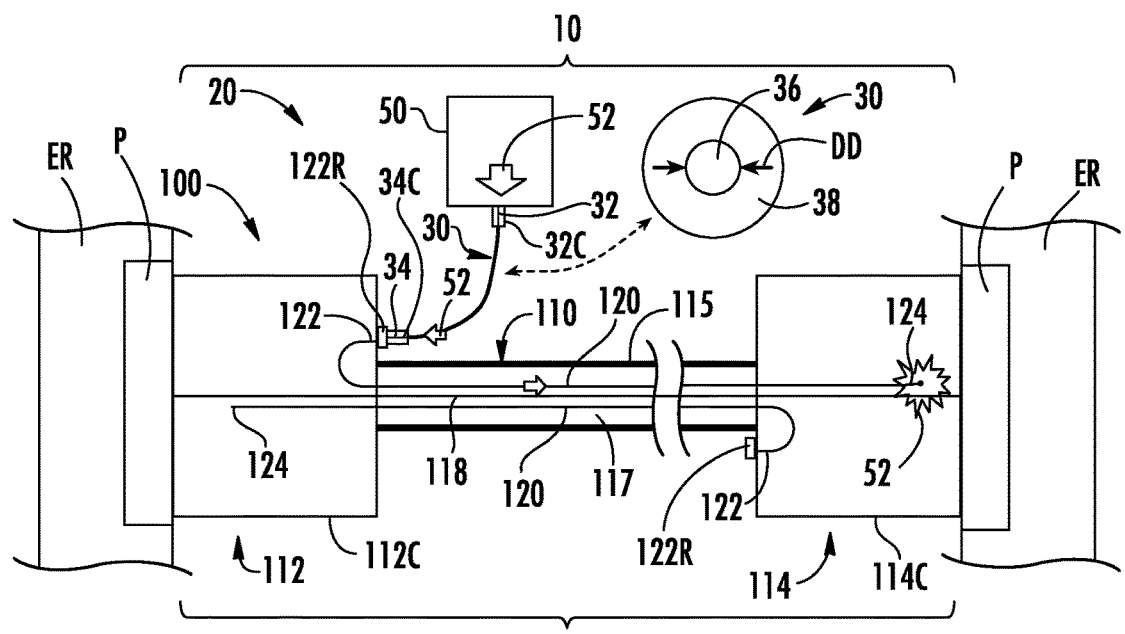
FIG. 2 is a schematic diagram of an example traceable end-point cable system that utilizes a light source system and a light source assembly as disclosed herein.

With this in mind, FIG. 2 is a schematic diagram of an example traceable end-point cable system ("cable system") 10. The cable system 10 includes a light source system 20 optically coupled to a traceable cable assembly ("cable assembly") 100. The traceable cable assembly 100 can also be referred to as a tracing cable assembly or a traceable jumper or a traceable patch cord.

The light source system 20 includes a delivery waveguide 30 operably connected to a light source assembly 50 that emits light 52. The delivery waveguide 30 serves as an umbilical between the light source assembly 50 and the cable assembly 100. In an example, the delivery waveguide 30 comprises a short section of optical fiber having a core 36 with a core diameter DD surrounded by a cladding 38 (see close-up inset in FIG. 2). In an example, the delivery waveguide 30 comprises a multimode optical fiber, and further in an example the multimode optical fiber has a core diameter DD of about 50 microns or greater and a NA of about 0.15 or greater.

The delivery waveguide 30 has first and second ends 32 and 34 that in an example are respectively supported by first and second connectors 32C and 34C. The light 52 from the light source assembly 50 is coupled into the first end 32 of the delivery waveguide 30, so that the first end 32 is also referred to hereinafter as the "input end" of the delivery waveguide. The second end 34 of the delivery waveguide 30 is optically connected to the traceable cable assembly 100 and so is referred to hereinafter as the "output end" of the delivery waveguide. Details of the light source assembly 50 are set forth in greater detail below.

The cable assembly 100 includes an optical fiber cable ("cable") 110. The cable 110 has first and second ends 112 and 114 that are respectively supported by first and second connectors 112C and 114C. In FIG. 2, the first and second connectors 112C and 114C are shown connected to respective ports P of respective equipment racks ER.

Figure 3:
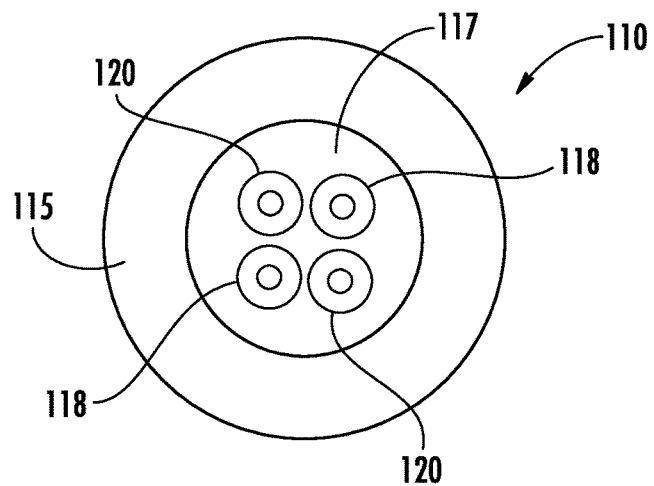
FIG. 3 is a cross-sectional view of an example cable used in the cable assembly of the traceable end-point cable system of FIG. 2.

FIG. 3 is a cross-sectional view of an example cable 110. The cable 110 has an outer jacket 115 that defines a conduit 117 that carries at least one data transmission element 118 (e.g., copper wire, optical fiber, etc.) and at least one tracer optical fiber 120. The tracer optical fiber allows accurate identification of at least one terminal end of the cable assembly 100 (e.g., at least one of connectors 112C and 114C), as described below. In FIG. 3, two tracer optical fibers 120 are shown along with two data transmission elements 118 by way of example. In FIG. 2, only one data transmission element 118 is shown.

As best seen in FIG. 2, each tracer optical fiber 120 has first and second ends 122 and 124. The first end 122 is the input end and the second end 124 is the output end. In an example, the first ends 122 of the tracer optical fibers 120 terminate at respective receptacles 122R on the first and second connectors 112C and 114C. In an example, the receptacles 122R (hereinafter, "connector receptacles") are configured to receive and engage the second connector 34C of the delivery waveguide 30. While the example cable 110 shown in FIG. 2 includes two tracing optical fibers 120, in other embodiments the cable 110 may include one tracing optical fiber or more than two tracing optical fibers.

Figure 4:
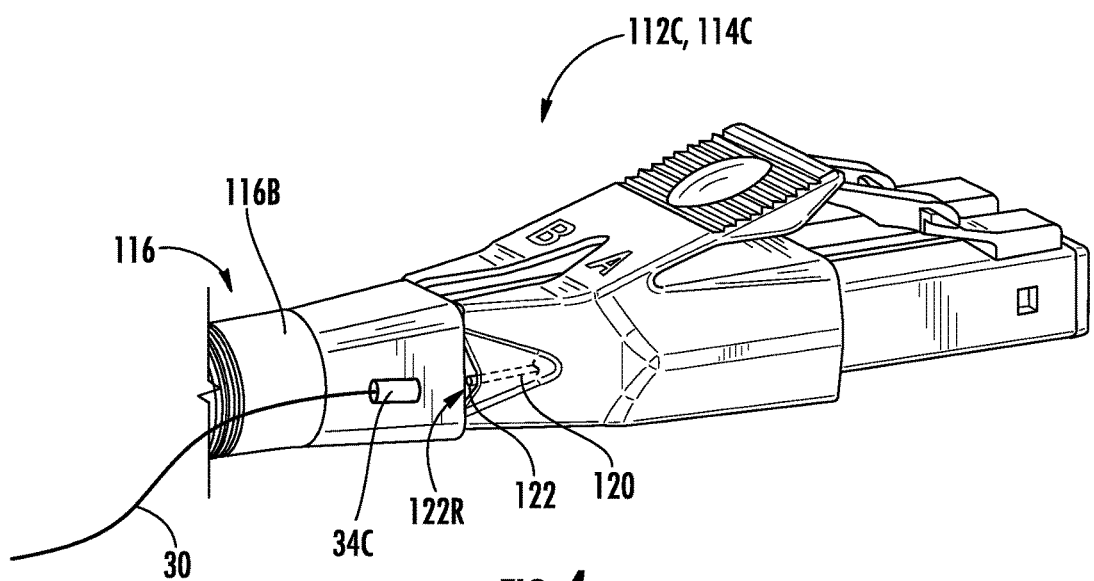
FIG. 4 is an elevated view of an example connector in the form of a duplex LC connector that can be used to terminate the ends of the cable used in the cable assembly of the traceable end-point cable system, and also shows a connectorized end of the delivery waveguide adjacent a receptacle in the connector that leads to an end of one of the tracer optical fibers carried by the cable.

In use, the cable assembly 100 may extend between two locations, such as between two equipment racks ER in a data center, a telecommunications room, or the like. The first and second connectors 112C and 114C allow the cable assembly 100 to serve as patch cord between components of a network. The types of first and second connectors 112C and 114C that can be used can vary widely depending on the nature of the cable 110 and the components being connected. The specific type of connectors 112C and 114C should match the port configurations of the network components being interconnected, and will vary based upon the quantity and type of signals being transmitted by the cable 110. Example connectors 112C and 114C for use in a cable assembly 100 may be any suitable type of connector, such as, for example, a duplex LC fiber optic connector, which is shown in FIG. 4. FIG. 4 also shows the example duplex LC fiber optic connector 112C or 114C having a back end 116 with a boot 116B.

With reference again to FIG. 2, the output ends 124 of the tracer optical fibers 120 constitute the light-emission end from which light 52 is emitted (outputted) after having traveled from the light source assembly 50, through the delivery waveguide 30, to the tracer optical fiber 120 and then over the length of the tracer optical fiber. In examples, the output ends 124 of the tracer optical fibers 120 can reside either at a surface portion of the corresponding connector 112C or 114C, or reside within the corresponding connector. In the latter case, at least part of the given connector 112C and 114C is made of a translucent or transparent material (or a semi-transparent or semi-translucent material) so that the light 52 emitted from the output end 124 of the tracer optical fiber 120 can be seen by a user (e.g., a technician). FIG. 2 shows an example where the light source system 50 is optically coupled to the input end 122 of the tracer optical fiber 120 at the connector 112C and shows the light 52 being emitted from the output end 124 of the same tracer optical fiber 120 at the connector 114C. While the embodiment of FIG. 2 shows light 52 being emitted only from the output end 124 of the tracer optical fiber 120, in other embodiments at least some of the light may also be emitted from the outer surface of the tracer optical fiber along at least some portions of its length to assist a user in identifying the location of the cable 110.

As noted above, In some embodiments, the connectors 112C and 114C are each configured with at least one connector receptacle 122R (see FIG. 4). The connector receptacles 122R need not be traditional connector receptacles but instead may comprise registration features, openings, indents or other features that help to direct light 52 into the input ends 122 of the tracing optical fibers 120. Thus, the receptacles 112R allow a user to launch light 52 from the output end 34 of the delivery waveguide 30 into the input end 122 of a select tracer optical fiber 120 at either of the connectors 112C or 114C. In one example, this is accomplished by inserting the output connector 34C of the delivery waveguide 30 into the desired connector receptacle 122R. For example, to trace connector 114C of the cable 110, the connector 34C of the delivery waveguide is inserted into the receptacle 112R on the connector 112C.

The use of receptacles 112R obviates the need to disconnect the connectors 112C and 114C from their respective connector ports P of equipment rack ER when performing the tracing operation. In an example, the connectors 112C and 114C can include a support structure (not shown) disposed over the connector boot 116B at the back end 116 of the connector, wherein the support structure is configured to facilitate engaging the output connector 34C of the delivery waveguide with the connector receptacle 122R.

Light Source Assembly

Figure 5:
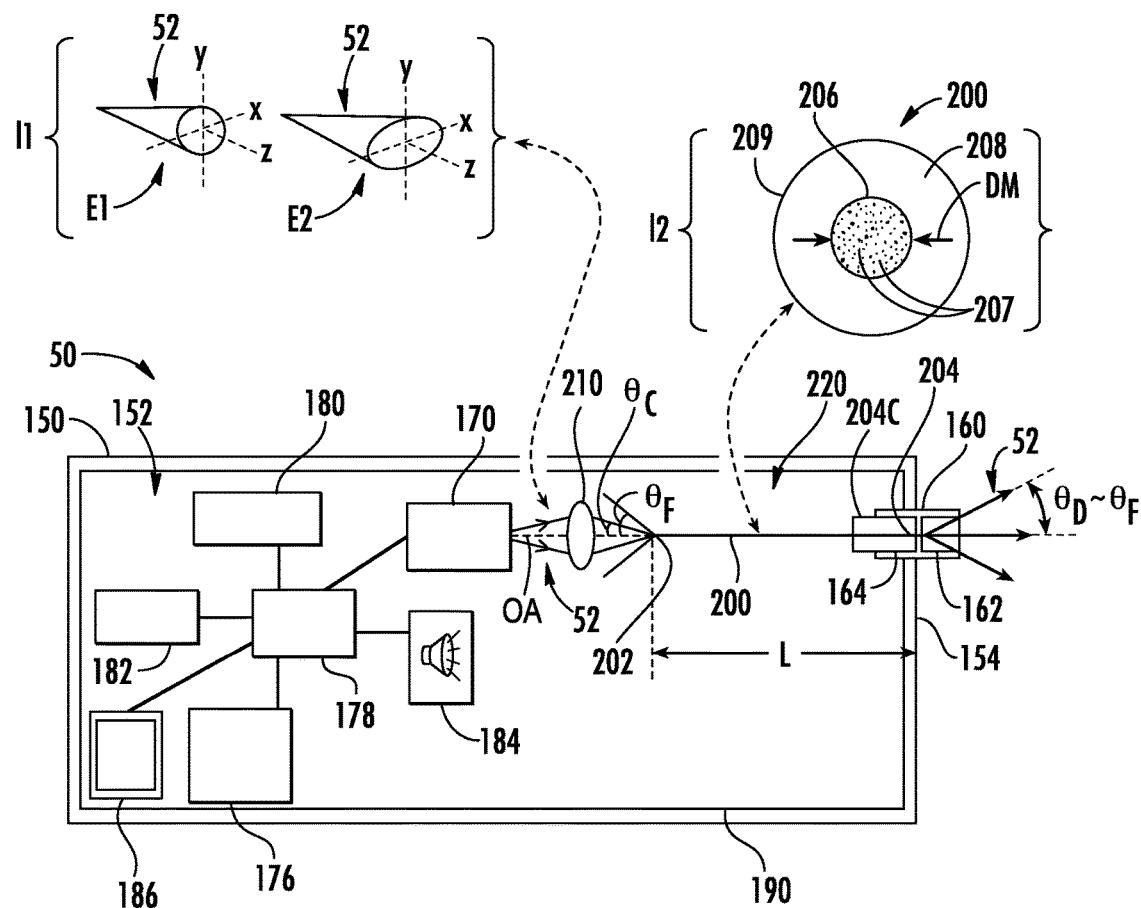
FIG. 5 is a schematic diagram of an example embodiment of a light source assembly of the light source system.
Figure 6:
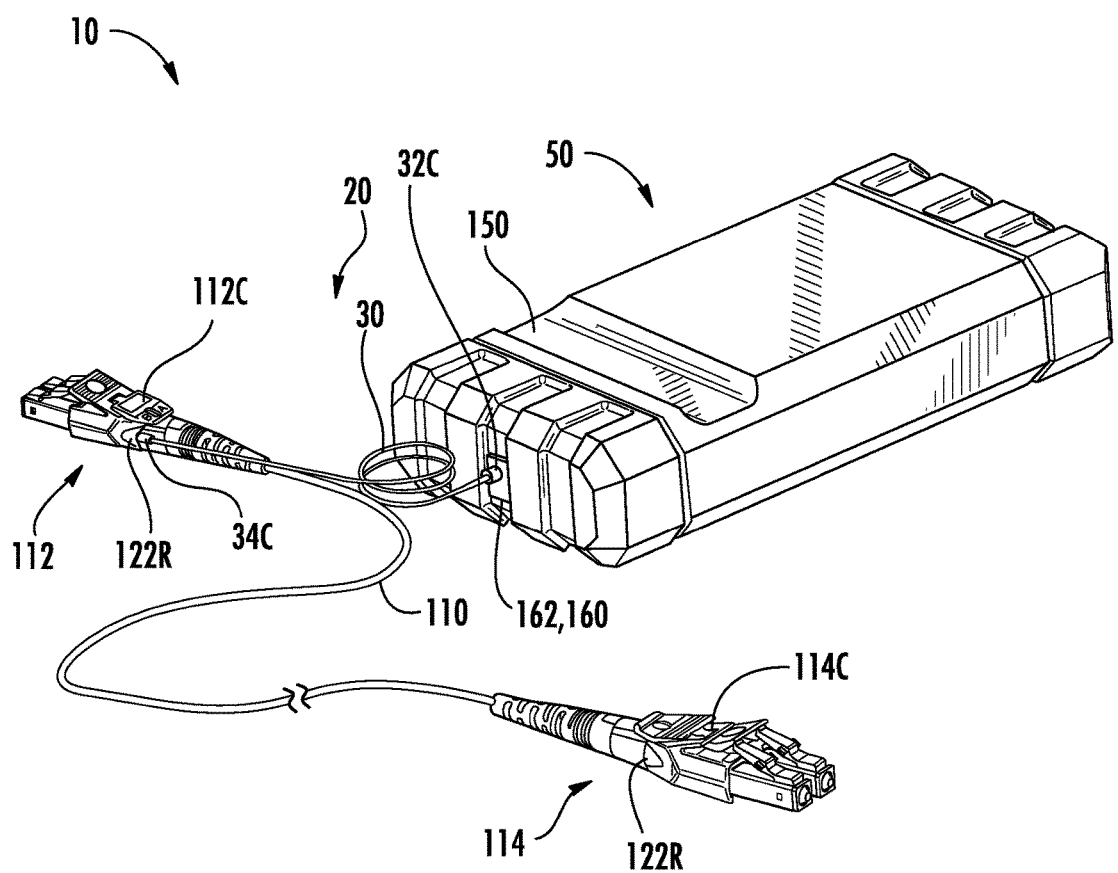
FIG. 6 is an elevated view of an example of the traceable end-point cable system of FIG. 2, showing an example housing for the light source assembly of the light source system.

FIG. 5 is a schematic diagram of an example of the light source assembly 50 used in system 10. The light source assembly 50 includes a housing 150 that defines a housing interior 152. The housing 150 includes a front wall or bulkhead 154 that supports a connector adapter 160. The connector adapter 160 has an outer receptacle 162 accessible from the outside of the housing and an inner receptacle 164 accessible from the housing interior 152. FIG. 6 is an elevated view of an example of the light source assembly 50 and the housing 150 as part of an example system 10.

An example of the light source assembly 50 includes, within housing interior 152, a light emitter 170 that emits light 52 generally along the direction of an optical axis OA. The light source assembly 50 also includes an electrical power source 176 (e.g., batteries), and control circuitry 178 respectively electrically connected to other components of light source assembly, to control the light emitter 170 and power usage. The light source assembly 50 may also include receiver 180 or other wireless communication components within the housing interior 152 or on the housing 150 to receive commands from an external controller. Furthermore, the light source assembly 50 can include at least one user interface feature, such as a switch 182 for activating/deactivating the control circuitry (e.g., an on/off switch), a speaker 184 to allow for the generation of audible signals, and a small display 186 for displaying the operating status and for directing inputs to the light source assembly 50.

In an example, the housing 150 is sized so that the light source assembly 50 can be hand held. For example, the housing 150 may be approximately the size of a standard flashlight or a smart phone. The housing 150 can also be much smaller or much larger depending on the application. In one non-limiting example, the housing 150 can have dimensions of about 150 mm×100 mm×40 mm. The housing 150 is preferably made of a durable material to protect the light source assembly 50 from potentially harsh environmental conditions and from dropping it onto a hard surface. In an example, at least some of the components of the light source assembly 50 are operably supported on a support substrate 190 that resides within the housing interior 152. In an example, the support substrate 190 comprises a printed circuit board.

In one embodiment, the light emitter 170 may emit light 52 having a visible wavelength, such in the green wavelength range (e.g., 495 nm to 570 nm) or the red wavelength range (e.g., 620 nm to 700 nm). In some embodiments, the light emitter is or includes a green laser diode (e.g., emitting in the 520 nm to 540 nm wavelength range), a light-emitting diode (LED) or a super-luminescent diode (SLD). Alternatively, emitted light 52 can have other colors/wavelengths (e.g., UV to IR wavelengths, such as from 350 nm to 3000 nm). Several factors may be considered when selecting an appropriate light emitter 170 and wavelength of light 52, and these factors may include, but are not limited to, visibility, cost, eye safety, peak power, power consumption, size, and commercial availability. In the case where light 52 does not have a visible wavelength, other means for detecting the light during the tracing operation can be employed other than direct eye viewing by a technician, such as goggles or other detection means configured to detect the given wavelength of the non-visible light.

In some embodiments, the optical power of the light emitter 170 can be as high as industry safety standards will allow. In one example, light emitter emits light in the 520 nm to 540 nm range (i.e., green light) with an optical power in the range from 20 milliwatts to 50 milliwatts, e.g. 40 milliwatts. In the example where the light emitter comprises one or more lasers, the lasers can be from classes 1, 1M, 2, 2M, 3R, 3B and 4. In another example, the light emitter 170 has an output power in the range from 20 milliwatts to 1000 milliwatts.

The inset I1 of FIG. 5 shows two example emission profiles E1 and E2 for light 52 as emitted from the light emitter 170 as divergent light. The example emission profile E1 shows the same angular divergence of light 52 in the x-z and y-z planes, i.e., is a rotationally symmetric emission profile. The example emission profile E2 shows the angular divergence of light 52 in the x-z plane being greater than in the y-z plane, i.e., is an asymmetric emission profile. An asymmetric emission profile is often associated with laser diodes and like semiconductor-based light emitters. The emission profiles from laser emitters is also typically both spatially and angularly Gaussian. In other words, the power per unit area is higher on axis and the power per unit angle is also higher on axis.

The light source assembly 50 also includes a multimode mode-homogenizing optical fiber 200. The mode-homogenizing optical fiber 200 has an input end 202, an output end 204 and a length L. The input end 202 can be defined by a polished end face. The output end 204 can be supported by a connector ("output connector") 204C configured to engage the inner receptacle 164 of adapter 160. In an example, the mode-homogenizing optical fiber 200 resides along the optical axis OA. In another example, the mode-homogenizing optical fiber can have a bend or be coiled for convenience or to reduce the size of the housing 150.

With reference to the close-up inset I2 of FIG. 5, the mode-homogenizing optical fiber 200 has a core 206 with a diameter DM and a cladding 208 that surrounds the core. The diameter DM of the core 206, the refractive index profile of the core (which can be step index or graded index), and the refractive index of the cladding define the aforementioned fiber angle $\theta_F$. The mode-homogenizing optical fiber 200 also has an outer surface 209.

The core 206 of the mode-homogenizing optical fiber 200 is shown in FIG. 5 by way of example as having light-redirecting features 207, such as nanoparticles or nanostructures, that facilitate the mode-homogenization process as described below. Some or all of the nanoparticles or nanostructures 207 can also reside in the cladding 208 since the modes of an optical fiber extend into and thus interact with the cladding to varying degrees. Other types of mode-homogenizing optical fibers may be used in other embodiments, and the embodiments herein are not limited to a specific type of mode-homogenizing optical fiber.

With continuing reference to FIG. 5, the input end 202 of the mode-homogenizing optical fiber 200 is optically coupled to the light emitter 170 and receives light 52 at a convergence angle $\theta_C$ that is less than the fiber angle $\theta_F$. In various examples, $\theta_C \leq (0.6) \cdot \theta_F$ or $\theta_C \leq (0.5) \cdot \theta_F$ or $\theta_C \leq (0.4) \cdot \theta_F$ or $\theta_C \leq (0.3) \cdot \theta_F$ or $\theta_{IC} \leq (0.25) \cdot \theta_F$ or $\theta_{IN} \leq (0.2) \cdot \theta_F$ or $\theta_C \leq (0.1) \cdot \theta_F$. In an example, the smallest convergence angle $\theta_C$ is limited by the single mode beam criteria. In another example, the smallest convergence angle $\theta_C$ is taken by way of approximation to be $\theta_C = 0°$, which represents a light ray traveling along the optical axis OA.

In an example where the emission profile of light 52 is asymmetric as described above, the convergence angle $\theta_C$ can also be asymmetric, depending on how the light is being coupled into the input end 202 of the mode-homogenizing optical fiber 200. In the case where the convergence angle $\theta_C$ is not the same in all planes (i.e., is asymmetric), the convergence angle $\theta_C$ can be taken as the smallest convergence angle. The largest possible divergence angle $\theta_D = \theta_F$.

In an example, optical coupling between the light emitter 170 and the input end 202 of the mode-homogenizing optical fiber 200 is accomplished using at least one optical element 210 operably disposed between the light emitter and the input end 202. In an example, the at least one optical element 210 is a single refractive lens element. Other types of optical elements 210 can also be effectively employed (e.g., diffractive optical elements, holographic optical elements, etc.) to receive the divergent light 52 from the light emitter 170 and form therefrom the convergent light that is coupled into the input end 202 of the mode-homogenizing optical fiber 200. The light emitter 170, the mode-homogenizing optical fiber 200, the coupling optical component 210 define an optical fiber pigtail assembly 220, or "fiber pigtail" for short.

For many light emitters 170, including lasers, the light emission profile for emitted light 52 has a limited angular range. As a consequence, the light 52 coupled into the end of an optical fiber has a relatively small convergence angle $\theta_C$ (and thus a small etendue or the focused beam area multiplied by the solid angle) at the input end 202 as compared to the fiber angle $\theta_F$. This results in the light 52 traveling down a conventional multimode optical fiber mainly if not entirely in the low-modes. Also, for typical fiber pigtails with a length on the order of 1 m to 2 m, the luminance (and etendue) will be the same at the output end 204 as at the input end 202. In some cases, the light 52 travels in only the fundamental mode or just the lowest of the low-order modes.

This is problematic because a smaller luminance (high etendue) is desired at the output end 204 of the multimode optical fiber wherein the light 52 is emitted over a large range of angles (i.e., a large divergence angle $\theta_D$) and preferably with a substantially uniform angular power density. Furthermore, a large divergence angle $\theta_D$ is need so that if the emitted light 52 is observed by user directly at connector adapter 160, it will have a luminance that is below a given eye safety threshold.

To this end, the mode-homogenizing optical fiber 200 is configured to re-direct light 52 that initially travels mainly or entirely within the low-order modes into substantially all the multiple modes, and especially into the high-order modes that initially carry no light or only a small fraction of the light. In an example, this is done by light diffusion or light scattering. Examples of light-diffusing and light-scattering optical fibers are disclosed in U.S. Pat. Nos. 8,591,087 and 8,620,125, which are incorporated by reference herein.

Figure 7:
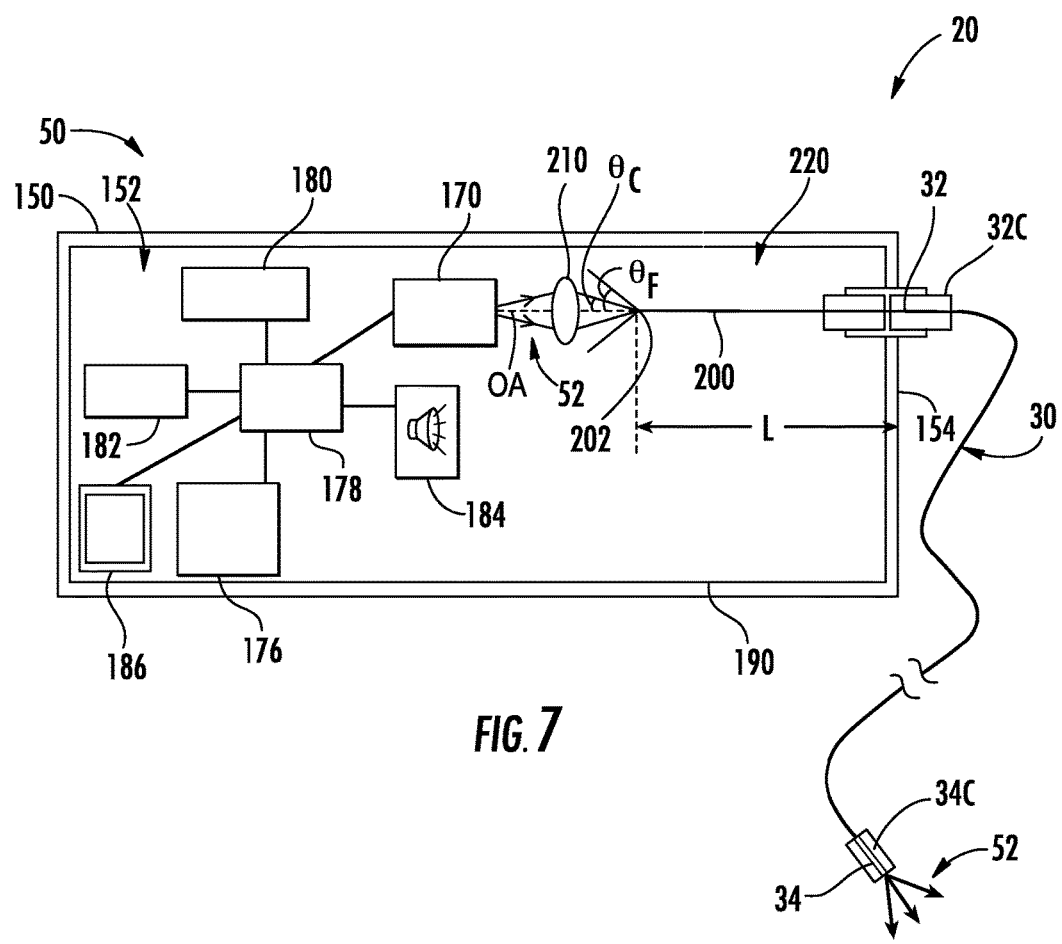
FIG. 7 shows the light source assembly coupled to a connectorized delivery waveguide to form an example light source system that can optically couple to the cable assembly.

As noted above, the light source assembly 50 may be optically coupled to the delivery waveguide 30 at the connector adapter 160, as shown in FIG. 7. In alternative embodiments, the light source assembly 50 may be optically connected to a connector or other delivery component without the use of an external delivery waveguide. Referring again to FIG. 5, the input connector 32C of the delivery waveguide 30 supports the input end 32 of the delivery waveguide and is configured to be received at the outer receptacle 162 of the connector adapter 160. This allows the input end 32 of the delivery waveguide 30 to be optically coupled to the output end 204 of the mode-homogenizing optical fiber 200. This configuration provides an optical path for light 52 from the light emitter 170 to the output end 34 of the delivery waveguide 30. The delivery waveguide 30 may be several meters in length, for example, so that the light source assembly 50 can be placed on the ground while the output connector 34C of the delivery waveguide 30 is engaged with the connector receptacle 122R of either of the first or second connectors 112C or 114C (see FIG. 4) for a traceable cable assembly 100 that resides several meters away from the light source assembly.

As discussed above in connection with FIG. 5, the mode-homogenizing optical fiber 200 receives light 52 from light emitter 170. The mode-homogenizing optical fiber 200 is, by definition, capable of receiving light 52 that converges onto the input end 202 within the fiber angle $\theta_F$, i.e., $\theta_C \leq \theta_F$. However, the inputted light 52 can have a convergence angle $\theta_C$ that is smaller than the fiber angle $\theta_F$ (e.g., in some cases $\theta_C = (0.3) \cdot \theta_F$ up to $\theta_C = (0.55) \cdot \theta_F$) due to the emission profile of the light 52 emitted by the light emitter 170. Furthermore, conventional optics cannot be used to greatly reduce the luminance of the inputted light 52 emitted by the light emitter because the luminance will generally be conserved.

Consequently, the light 52 inputted into the input end 202 of the mode-homogenizing optical fiber 200 at a convergence angle $\theta_C \leq \theta_F$ initially fills mainly if not only a portion of the total available waveguide modes (e.g., some or all of the low-order modes) of the mode-homogenizing optical fiber 200. Here, it is noted that when the light 52 emitted from light emitter 170 has a Gaussian profile, a relatively small amount of light will enter and travel in the high-order modes as noted above. However, the light 52 initially traveling in the mode-homogenizing optical fiber 200 will be concentrated in the low-order modes.

The mode-homogenizing optical fiber 200 is configured (e.g., with light-redirecting features 207 in core 206) to re-distribute the inputted light 52 to substantially uniformly fill all of the modes of the mode-homogenizing optical fiber by the time the light travels over a select length LHM, which is referred to herein as the mode-homogenization length. When full mode homogenization is achieved, the light 52 emitted from the output end 204 has a divergence angle $\theta_D = \theta_F$.

In an example, the mode-homogenizing optical fiber 200 also homogenizes the emission profile from the output end 204 so that it is substantially uniform as function of both spatial position and angle of emission. In other words, the power per unit area and the power per unit angle of the outputted light 52 are substantially constant across the core 206 and over the range of angles defined by the divergence angle $\theta_D$. In an example, the spatial uniformity and angular uniformity each vary by no more than +/-5% or +/-3%.

The light-redirecting property of the mode-homogenizing optical fiber 200 renders the fiber pigtail "optical system" non-ideal in that the luminance is not conserved and the etendue can be different at the input end versus the output end of this optical system. In an example, the luminance of the light 52 inputted into the input end 202 of the mode-homogenizing optical fiber 200 would not pass a select eye safety standard while the luminance of the light 52 outputted from the output end 204 of the mode-homogenizing optical fiber would pass the same select eye safety standard. Eye safety standards have been issued by the American National Standards Institute for class 1, 1M, 2, 2M, 3R, 3B and 4 lasers, and in examples, the laser emitter 170 can comprise at least one of these types of lasers.

The relatively large divergence angle $\theta_D$ (along with loss of some light via radiation modes) serves to reduce the luminance of light 52 outputted at the output end 204 of the mode-homogenizing optical fiber 200. If the divergence angle $\theta_D$ of the light 52 emitted at the output end 204 of the mode-homogenizing optical fiber 200 were greater than the fiber angle $\theta_F$, there would be an increase in the coupling loss (i.e., a decrease in the coupling efficiency) with respect to the delivery waveguide 30. If the divergence angle $\theta_D$ of the light 52 emitted at the output end 204 of the mode-homogenizing optical fiber 200 were significantly smaller than the fiber angle $\theta_F$, the luminance might not be sufficiently reduced and can lead to eye safety issues when the delivery waveguide 30 is not connected to the light source assembly 50. This is because light 52 can be emitted from the output end 204 of the mode-homogenizing optical fiber 200 to the outside environment through the unoccupied outside receptacle 162 of the connector adapter 160 when the delivery waveguide is 30 is not operably connected to the light source assembly 50.

The core diameter DM of the mode-homogenizing optical fiber 200 is preferably less than or equal to the core diameter DD of the delivery waveguide 30 and also preferably has a NA that is less than or equal to the NA of the delivery waveguide. A preferred configuration is for the mode-homogenizing optical fiber 200 and the delivery waveguide 30 to have the same core diameters, i.e., DM=DD, and the same NAs. In this case, good coupling between the mode-homogenizing fiber 200 and the delivery waveguide 30 is obtained while also ensuring the maximum divergence angle $\theta_D$ for light 52 emitted from the output end 204 of the mode-homogenizing optical fiber 200. In an example, the mode-homogenizing optical fiber 200 and the delivery waveguide each support the same (or close to the same) number of modes at the visible wavelength of light 52.

The mode-homogenization process that relies on light-redirecting features 207 tends to be less than 100% efficient in that it results in directing a non-zero portion of the light 52 into radiation modes that exit the outer surface 209 of the mode-homogenizing optical fiber. Thus, a mode-homogenizing optical fiber 200 that operates via light redirection can be characterized by a "radiation length" LR over which 90% of the light coupled into the fiber is directed out of the outer surface 209 via the radiation modes. As noted above, the mode-homogenization length LMH of the mode-homogenizing optical fiber 200 is the length required to substantially fill all the modes (e.g., 90% or greater mode homogenization). In an example, the mode-homogenization length LMH is about 10% to 20% of the radiation length LR, i.e., =0.2LR≤LMH≤0.3LR. For example, if the mode-homogenizing optical fiber 200 has a radiation length LR=0.7 m, then the mode-homogenization length LMH is about 0.2 m.

In example, the length L can be in the range (0.8)·LMH≤L≤(1.25)·LMH or more preferably (0.95)·LMH≤L≤(1.05)·LMH. In an example, the length L of the mode-homogenizing optical fiber 200 is selected so that the divergence angle $\theta_D$ is substantially the same as the fiber angle $\theta_F$, i.e., $(0.9) \cdot \theta_F \leq \theta_D \leq \theta_F$ or $(0.95) \cdot \theta_F \leq \theta_D \leq \theta_F$.

If the loss due to the radiation modes would make the light 52 outputted from the output end 124 of the tracer optical fiber 120 too dim for the user (e.g., technician) to observe, then the length L of the mode-homogenizing optical fiber can be on the shorter side to tradeoff mode homogenization for reduced loss (i.e., increased output luminance). If there is margin between the luminance of the light source assembly 50 and the desired eye safety standard or if a higher eye safety standard is acceptable, the light source 50 can be designed to operate more efficiently Likewise, in some case, the length L can be on the longer side if the overall brightness of the outputted light 52 from the output end 124 of the tracer optical fiber 120 needs to be reduced.

Figure 8:
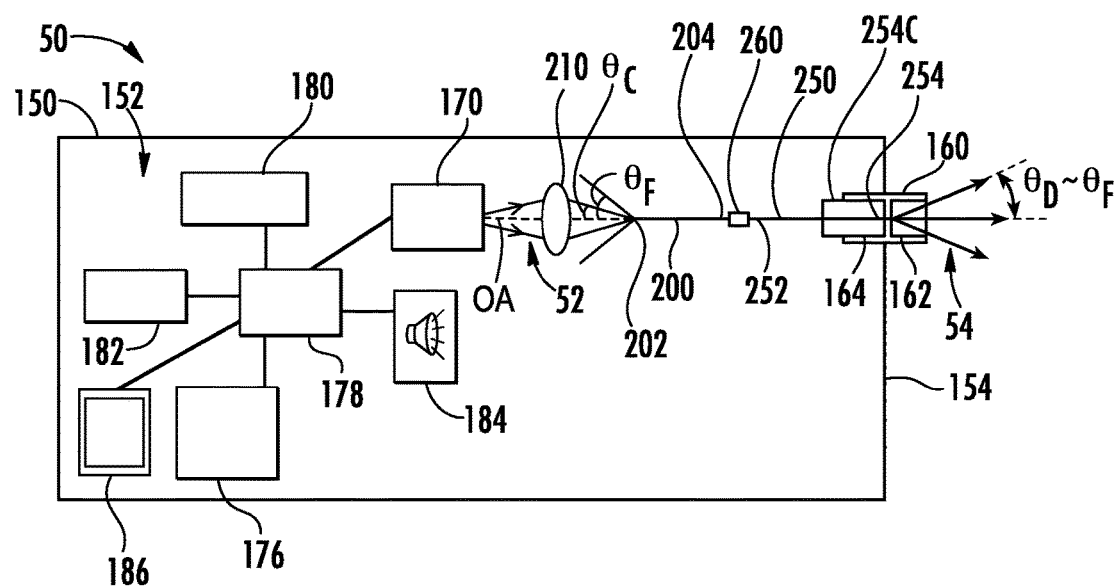
FIG. 8 illustrates an example light source assembly that includes a section of conventional multimode optical fiber optically coupled to a section of mode-homogenizing optical fiber.

FIG. 8 is similar to FIG. 5 and shows an example configuration wherein the light source assembly 50 includes a short length of conventional multimode optical fiber 250 that has an input end 252 and an output end 254. The input end 252 is optically coupled to the output end 204 of the mode-homogenizing optical fiber 200 using an optical coupling feature 260 (e.g., a splice). The output end 254 is supported by a connector 254C that resides within the inner receptacle 164 of the connector adapter 160. In an example, the conventional multimode optical fiber 250 has a NA that matches the NA of the mode-homogenizing optical fiber 200 and the NA of the delivery waveguide 30. In this configuration, the light 52 inputted into the input end 252 of the convention multimode optical fiber from the output end 204 of mode-homogenizing optical fiber 200 fills all the modes of the conventional optical fiber so that the light 52 emitted from the output end 254 of the conventional multimode optical fiber has a large divergence angle. This light is then coupled into the input end 32 of the delivery waveguide 30 when the input-end connector 32C engages the output receptacle 162 of the connector adapter 160.

Figure 9:
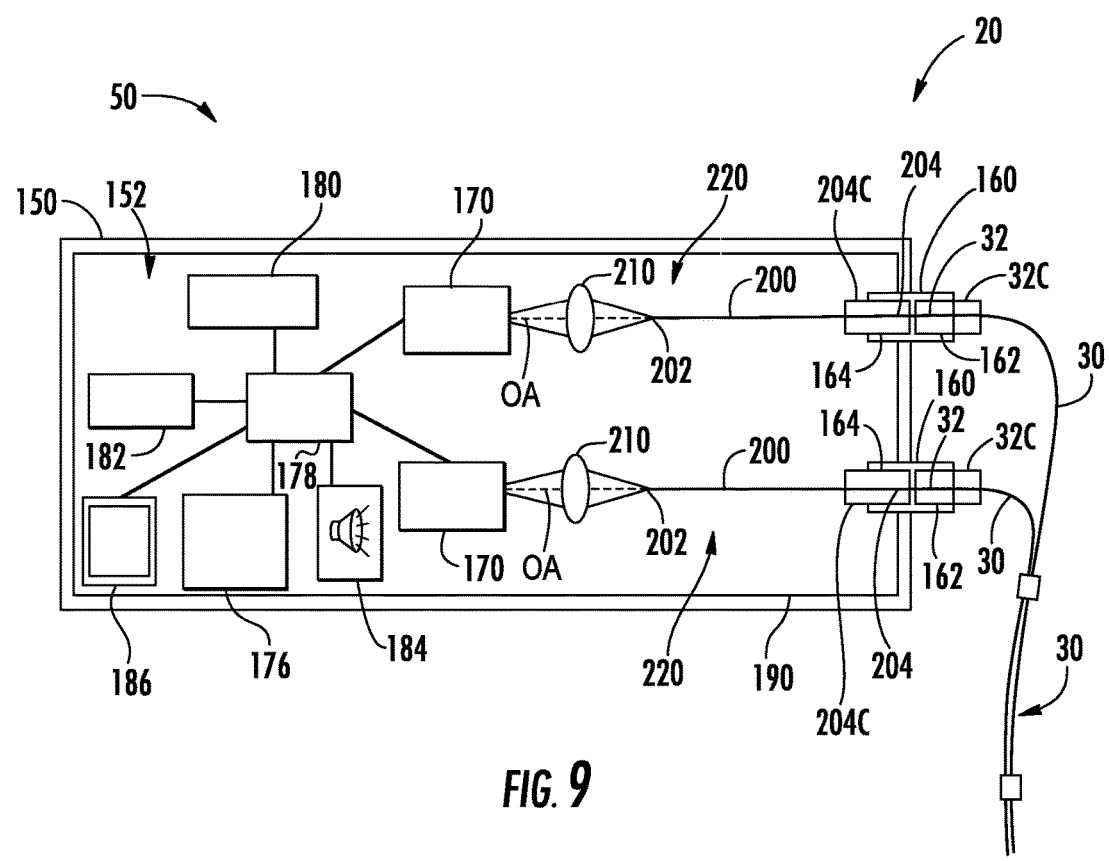
FIG. 9 illustrates an example light source system wherein the light source assembly includes two light emitters and wherein the delivery waveguide includes two optical fibers.
Figure 10:
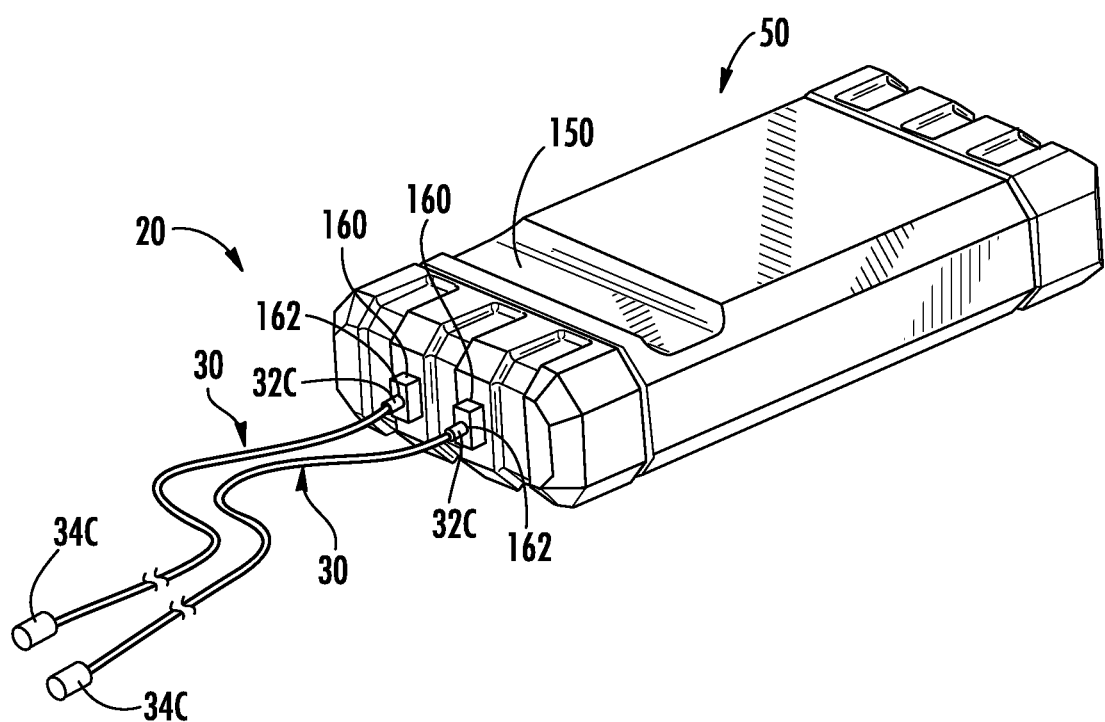
FIG. 10 is an elevated view of an example of the light source system of FIG. 9 showing an example housing similar to the housing of the light source assembly shown in FIG. 6.

FIG. 9 is similar to FIG. 7 and shows an example light source system 20 wherein the light source assembly includes two fiber pigtails 220 and two connector adapters 160. This configuration allows for the simultaneous use of two delivery waveguides 30 to be optically connected to two different traceable cable assemblies 100 or to two different locations of a single traceable cable assembly. In an example, the two light emitters 170 can emit light 52 having different colors. In another example, the dual light-emitter embodiment of FIG. 9 can be used to trace the two branches of a duplex LC connector 112C or 114C (see FIG. 4). FIG. 10 is an elevated view of an example of the light source system 20 of FIG. 9 showing an example housing 150 similar to that shown in FIG. 6.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A light source assembly for use with a multimode delivery waveguide having an input end supported by an input connector, comprising:

a housing having an interior and a bulkhead;

a light emitter that resides within the interior of the housing and that emits visible light with a wavelength between 520 nm and 540 nm and an optical power in a range from 20 milliwatts to 1000 milliwatts;

a multimode mode-homogenizing optical fiber that has an input end, an output end, a fiber length, and light-redirecting features to facilitate mode-homogenization by redirecting light from low-order modes to higher-order modes, wherein the input end is optically coupled to the light emitter to receive the visible light, and wherein a mode-homogenization length LMH is a minimum length required for at least 90% mode-homogenization and the fiber length is in a range from (0.8)·LMH to (1.25)·LMH so that the output end emits the light at a substantially maximum divergence angle;

an output connector at the output end of the mode-homogenizing optical fiber; and a connector adapter having inner and outer receptacles, with the output connector of the mode-homogenizing optical fiber is configured for engagement with the inner receptacle and wherein the outer receptacle is configured for receiving the input connector of the multimode delivery waveguide.

2. The light source assembly according to claim 1, wherein the connector adapter is located at the bulkhead.

3. The light source assembly according to claim 1, wherein the optical coupling between the light emitter and the input end of the mode-homogenizing optical fiber is performed by a single lens element.

4. The light source assembly according to claim 1, wherein the light emitter comprises a laser.

5. The light source assembly according to claim 1, wherein the mode-homogenizing optical fiber has a radiation length LR over which 90% of the light coupled into the mode-homogenizing optical fiber is directed out of the mode-homogenizing optical fiber via radiation modes and wherein the mode-homogenization length LMH is in a range from (0.2)·LR (0.3)·LR.

6. The light-source assembly according to claim 1, wherein the fiber length is in a range from (0.95)·LMH to (1.05)·LMH.

7. The light-source assembly according to claim 1, further comprising:
control circuitry electrically connected to the light emitter;
an electrical power source electrically connected to the control circuitry; and
a switch electrically connected to the control circuitry to control the operation of the control circuitry.

8. The light-source assembly according to claim 1, wherein the light emitter has an output power of between 20 and 1000 milliwatts.

9. The light-source assembly according to claim 1, wherein the mode-homogenizing optical fiber comprises a light-diffusing or light-scattering optical fiber.

10. The light-source assembly according to claim 1, further comprising the multimode delivery waveguide, wherein the input connector of the multimode delivery waveguide is operably engaged with the outer receptacle of the connector adapter so that the input end of the multimode delivery waveguide is optically coupled to the output end of the mode-homogenizing optical fiber.

11. The light-source assembly according to claim 10, wherein the delivery waveguide has an output connector coupled thereto and further comprising:
a traceable cable assembly that comprises a cable that supports at least one data element and at least first and second tracer optical fibers respectively, the traceable cable assembly further comprising first and second connectors that respectively terminate first and second opposite ends of the cable, the first and second connectors respectively having first and second receptacles that respectively terminate first and second input ends of the first and second tracer optical fibers, and wherein first and second output ends of the first and second tracer optical fibers respectively terminate at the second and first connectors; and
wherein the output connector of the delivery waveguide is operably engaged with one of the first and second connector receptacles of one of the first and second connectors of the traceable cable assembly.

12. A light source system for use with a traceable cable assembly terminated by first and second connectors, comprising:
a light emitter that emits light with a wavelength between 520 nm and 540 nm and an optical power in a range from 20 milliwatts to 1000 milliwatts;
a section of multimode mode-homogenizing optical fiber having an input end, an output end, a fiber length, and light-redirecting features to facilitate mode-homogenization by redirecting light from low-order modes to higher-order modes, and a fiber angle $\theta_F$, wherein a mode-homogenization length LMH is a minimum length required for at least 90% mode-homogenization and the fiber length is in a range from (0.8)·LMH to (1.25)·LMH, and wherein the fiber angle $\theta_F$ is a maximum angle measured to a center axis of the optical fiber over which the optical fiber can receive and emit light;
an optical component operably disposed between the light emitter and the input end of the mode-homogenizing optical fiber to couple light into the input end of the mode-homogenizing optical fiber at a convergence angle $\theta_C$ that is less than the fiber angle $\theta_F$ and wherein the output end is supported by an output connector and wherein the output end emits the light at a divergence angle $\theta_D$ in a range (0.9)·$\theta_F$ to (1.0)$\theta_F$;
a connector adapter having first and second receptacles, wherein the output connector is configured for engagement in the first receptacle; and
a multimode delivery waveguide having an input end terminated by an input connector, wherein the input connector is configured to be operably engaged and disengaged with the second receptacle of the connector adapter.

13. The light source system according to claim 12, wherein the optical component consists of a single lens element.

14. The light source system according to claim 12, wherein the light emitter comprises a laser that emits light at a visible wavelength.

15. The light source system according to claim 12, wherein the mode-homogenizing optical fiber has a radiation length LR over which 90% of the light coupled into the fiber is directed out of the fiber via radiation modes and wherein the mode-homogenization length LMH is in a range from (0.2)·LR to (0.3)·LR.

16. The light-source system according to claim 12, wherein the fiber length is in a range from (0.95)·LMH to (1.05)·LMH.

17. The light-source system according to claim 12, further comprising:
control circuitry electrically connected to the light emitter;
an electrical power source electrically connected to the control circuitry; and
a switch electrically connected to the control circuitry to control the operation of the control circuitry.

18. The light-source system according to claim 12, wherein the mode-homogenizing optical fiber comprises a light-diffusing optical fiber or a light-scattering optical fiber.

19. The light-source system according to claim 12, wherein the multimode delivery waveguide comprises a multimode optical fiber.

20. The light-source system according to claim 12, further comprising an output connector, wherein the multimode delivery waveguide has an output end terminated by the output connector and wherein the output connector is configured to be engaged and disengaged with respective first and second connector receptacles of the first and second connectors of the traceable cable assembly.

21. A method of generating light for use in tracing an end of a cable assembly, comprising:
a) coupling convergent visible light with a wavelength between 520 nm and 540 nm and an optical power in a range from 20 milliwatts to 1000 milliwatts into an input end of a multimode mode-homogenizing optical fiber configured to redirect light from low-order modes to higher order modes and comprising an output end, a fiber angle $\theta_F$, and a fiber length, and light-redirecting features to facilitate mode-homogenization, wherein the convergent visible light is initially concentrated in the low-order modes, wherein the fiber angle $\theta_F$ is a maximum angle measured to a center axis of the optical fiber over which the optical fiber can receive and emit light; and
b) conveying the convergent visible light through the fiber length of the mode-homogenizing optical fiber to form outputted light that is substantially mode-homogenized, substantially spatially uniform, and substantially angularly uniform and having a divergence angle $\theta_D$ in a range from $(0.9) \cdot \theta_F$ to $(1.0)\theta_F$.

22. The method according to claim 21, wherein a mode-homogenization length LMH is a minimum length required for at least 90% mode-homogenization and the fiber length is in a range from $(0.8) \cdot$LMH to $(1.25) \cdot$LMH.

23. The method according to claim 21, further comprising prior to step a):
emitting the visible light from a light emitter as divergent visible light; and
receiving the divergent visible light at an optical component that converts the divergent visible light into the convergent visible light.

24. The method according to claim 23, wherein the light emitter comprises a laser and wherein the optical component consists of a single lens element operably disposed between the laser and the input end of the mode-homogenizing optical fiber.

25. The method according to claim 21, wherein the fiber length is in a range from $(0.95) \cdot$LMH to $(1.05) \cdot$LMH.

26. The method according to claim 21, wherein the mode-homogenizing optical fiber comprises either a light-diffusing or light-scattering optical fiber.

27. The method according to claim 21, further comprising:
delivering the outputted light to an input end of a tracer optical fiber supported by a traceable patch cord.

28. The method according to claim 21, wherein the convergent light does not satisfy an eye safety standard and wherein the outputted light satisfies said eye safety standard.

* * * * *

UNITED STATES PATENT AND TRADEMARK OFFICE
CERTIFICATE OF CORRECTION

PATENT NO. : 10,234,614 B2
APPLICATION NO. : 15/411183
DATED : March 19, 2019
INVENTOR(S) : Anthony Sebastian Bauco It is certified that error appears in the above-identified patent and that said Letters Patent is hereby corrected as shown below:

On the Title Page

On page 3, Column 2, item (56), U.S. Patent Documents, Line 4, delete "2016/0377616" and insert -- 2016/0377818 --, therefor.

On page 3, Column 2, item (56), Other Publications, Line 5, delete "Characterizaion" and insert -- Characterization --, therefor.

On page 3, Column 2, item (56), Other Publications, Line 5, delete "EmmittingPolymeric" and insert -- Emitting Polymeric --, therefor.

On page 3, Column 2, item (56), Other Publications, Line 6, delete "Jounal" and insert -- Journal --, therefor.

On page 4, Column 1, item (56), Other Publications, Line 14, delete "ofTi02" and insert -- of $TiO_2$ --, therefor.

On page 4, Column 1, item (56), Other Publications, Line 23, delete "Galvonarneters," and insert -- Galvanometers, --, therefor.

On page 4, Column 1, item (56), Other Publications, Line 24, delete "Acessories," and insert -- Accessories, --, therefor.

On page 4, Column 1, item (56), Other Publications, Line 25, delete "oage." and insert -- page. --, therefor.

On page 4, Column 2, item (56), Other Publications, Line 16, delete "experiements" and insert -- experiments --, therefor.

Signed and Sealed this
Twenty-first Day of January, 2020

Andrei Iancu
*Director of the United States Patent and Trademark Office*

In the Claims

In Column 13, Line 30, Claim 5, after "LR" (first occurrence) insert -- to --.

In Column 14, Line 19, Claim 12, delete "modes," and insert -- modes --, therefor.